United States Patent
Lee et al.

(10) Patent No.: US 11,666,989 B2
(45) Date of Patent: Jun. 6, 2023

(54) LASER CRYSTALLIZING APPARATUS

(71) Applicant: SAMSUNG DISPLAY CO., LTD., Yongin-si (KR)

(72) Inventors: Hong Ro Lee, Seongnam-si (KR); Chung Hwan Lee, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 456 days.

(21) Appl. No.: 16/842,272

(22) Filed: Apr. 7, 2020

(65) Prior Publication Data

US 2020/0230741 A1 Jul. 23, 2020

Related U.S. Application Data

(62) Division of application No. 15/131,226, filed on Apr. 18, 2016, now abandoned.

(30) Foreign Application Priority Data

Aug. 27, 2015 (KR) .......................... 10-2015-0121077

(51) Int. Cl.
*B23K 26/12* (2014.01)
*B23K 26/352* (2014.01)

(52) U.S. Cl.
CPC .......... *B23K 26/127* (2013.01); *B23K 26/352* (2015.10)

(58) Field of Classification Search
CPC ................ B23K 26/127; B23K 26/352; B23K 26/0732; B23K 26/066
See application file for complete search history.

(56) References Cited

U.S. PATENT DOCUMENTS

| 5,418,092 | A | | 5/1995 | Okamoto | |
|---|---|---|---|---|---|
| 5,657,539 | A | | 8/1997 | Orikasa et al. | |
| 6,008,144 | A | * | 12/1999 | Shih | B23K 26/0732 438/905 |
| 6,680,460 | B1 | * | 1/2004 | Takaoka | B23K 26/066 219/121.73 |
| 7,326,876 | B2 | | 2/2008 | Jung | |

(Continued)

FOREIGN PATENT DOCUMENTS

| JP | 2001156014 | 6/2001 |
|---|---|---|
| KR | 10-2004-0031276 | 4/2004 |

(Continued)

OTHER PUBLICATIONS

English_Translation_of_WO2014065168A1 (Year: 2012).*

(Continued)

*Primary Examiner* — Helena Kosanovic
*Assistant Examiner* — Tiffany T Tran
(74) *Attorney, Agent, or Firm* — F. Chau & Associates, LLC

(57) ABSTRACT

Provided is a laser crystallizing apparatus including a laser generator generating a laser beam and an optical system photo-converting the laser beam to make a converted laser beam. A beam transmitting unit includes a passage through which the converted laser beam is transmitted into the chamber. The beam transmitting unit includes a chamber window provided on the chamber to transmit the laser beam, and a shield window movably disposed below the chamber window to prevent a material generated in the chamber from reaching the chamber window.

5 Claims, 6 Drawing Sheets

(56) References Cited

U.S. PATENT DOCUMENTS

| | | |
|---|---|---|
| 2003/0171837 A1 | 9/2003 | Yamazaki et al. |
| 2010/0147814 A1 | 6/2010 | Watanabe |
| 2013/0087547 A1 | 4/2013 | Hunter et al. |
| 2013/0341313 A1 | 12/2013 | Himmelsbach et al. |
| 2014/0183174 A1 | 7/2014 | Yoon et al. |
| 2014/0308768 A1 | 10/2014 | Myoung et al. |
| 2015/0263595 A1* | 9/2015 | Miller ............... G21K 1/043 310/15 |
| 2015/0367574 A1 | 12/2015 | Araie et al. |
| 2016/0250715 A1 | 9/2016 | Burbaum et al. |
| 2017/0057019 A1 | 3/2017 | Lee et al. |
| 2017/0098562 A1 | 4/2017 | Lee et al. |

FOREIGN PATENT DOCUMENTS

| | | |
|---|---|---|
| KR | 10-2005-0002277 | 1/2005 |
| KR | 10-2008-0056524 | 6/2008 |
| KR | 10-2009-0097145 | 9/2009 |
| KR | 10-2014-0094354 | 7/2014 |
| WO | 2014065168 | 5/2014 |

OTHER PUBLICATIONS

English Translation of JP2001156014A (Year: 1999).*
Properties of Quartz and Glass.
Office Action dated Nov. 16, 2021 of the corresponding Korean Patent Application No. 10-2015-0121077 (3 pages) (in Korean).

* cited by examiner

LASER CRYSTALLIZING APPARATUS

CROSS-REFERENCE TO RELATED APPLICATION

This application claims priority under 35 U.S.C. § 119 to Korean Patent Application No. 10-2015-0121077 filed in the Korean Intellectual Property Office on Aug. 27, 2015, and to U.S. patent application Ser. No. 15/131,226 filed on Apr. 18, 2016, the disclosures of which are incorporated by reference herein in their entirety.

1. TECHNICAL FIELD

Exemplary embodiments of the present invention relate to an apparatus, and more particularly to a laser crystallizing apparatus.

2. DISCUSSION OF RELATED ART

A laser crystallizing apparatus may include a laser generator, an energy source, an optical system emitting a laser beam, and a chamber which may be a space where a substrate is crystallized by the laser beam emitted from the optical system.

The laser beam emitted from the optical system may be input to the chamber and the substrate in the chamber may be crystallized. The chamber may include a chamber window (e.g., an anneal window). In the chamber window, relatively high beam transmittance may reduce energy loss of the laser, and a relatively large thickness may tolerate a difference between internal pressure and external pressure of the chamber.

A temperature of the substrate melted by the laser beam may momentarily increase up to a melting point (e.g., about 1,300° C. or more in the case of silicon (Si)), and a substrate surface material may be evaporated and may be deposited on a chamber window surface. In the case of a flexible substrate, a hume may contaminate the chamber window.

When the lower portion of the chamber window is contaminated, the transmittance of the laser beam may be reduced and thus the beam energy reaching the substrate may be reduced, and an energy shortage phenomenon may occur. A degree of contamination may vary for each position and a line stain defect according to energy non-uniformity may be generated. Thus, the chamber window may be replaced relatively frequently, and an atmosphere in the chamber may be broken and particles may be generated when the chamber window is replaced.

SUMMARY

Exemplary embodiments of the present invention may provide a laser crystallizing apparatus reducing or eliminating contamination of a chamber window and substantially uniformly crystallizing a target thin film on a substrate. The laser crystallizing apparatus according to an exemplary embodiment of the present invention may include a shield window below the chamber window.

An exemplary embodiment of the present invention provides a laser crystallizing apparatus including a laser generator generating a laser beam and an optical system photoconverting the laser beam to make a converted laser beam. A beam transmitting unit includes a passage through which the converted laser beam is transmitted into the chamber. The beam transmitting unit includes a chamber window provided on the chamber to transmit the laser beam, and a shield window movably disposed below the chamber window to prevent a material generated in the chamber from reaching the chamber window.

The beam transmitting unit may include a shield mask in which an open region through which the laser beam passes is formed. A target substrate on which a target thin film is formed may be disposed in the chamber.

The shield mask unit may include two or more open regions formed on a path where the laser beam is transmitted to the inside of the chamber and a path where the laser beam is transmitted to the outside of the chamber, respectively.

The shield mask may include aluminum (Al) or stainless steel (SUS).

The shield window may include quartz.

The shield window may be movable in a vertical direction with respect to a length direction of the chamber window.

An edge of the shield window may be supported by a jig, and the jig may be movable by driving a linear motor supporting the jig.

The laser beam may be a linear laser beam having a long axis of from about 200 mm to about 3,000 mm and a short axis of from about 0.1 mm to about 20 mm.

The laser beam may be transmitted into the chamber window at an angle of from about 1° to about 10° with respect to a bottom surface of the chamber window.

The shield window may have a polygonal column shape having an even number of surfaces.

The beam transmitting unit may further include a shield mask in which an open region through which the laser beam passes is formed.

The shield window may be rotatable.

The shield window may have any one shape of a hexagon, an octagon, and a decagon.

The shield window may be disposed on a path where the laser beam is transmitted into the chamber and a path where the laser beam is transmitted to the outside of the chamber, respectively.

According to an exemplary embodiment of the present invention, the shield window may be movable or rotatable, and thus it may be possible to use the chamber window substantially without replacement of the chamber window.

According to an exemplary embodiment of the present invention, the shield window may be a planar or polygonal shield window which may be used multiple times, and thus the chamber may be used for a relatively long period of time without opening the chamber.

According to an exemplary embodiment of the present invention, a frequency of replacement of the chamber window may be reduced and replacement costs of the chamber window may be reduced.

DETAILED DESCRIPTION

Figure 1:
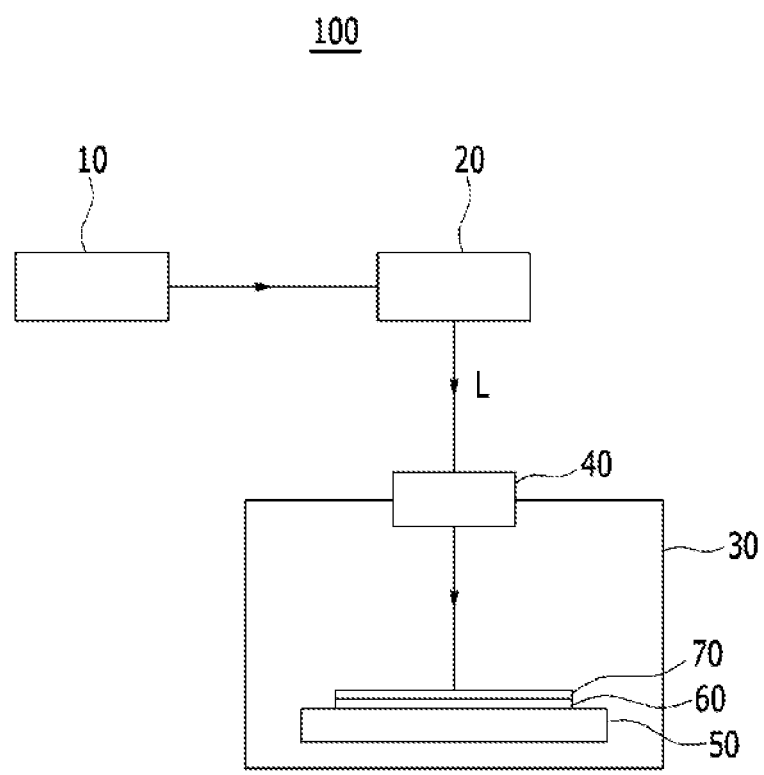
FIG. 1 is a diagram schematically illustrating a laser crystallizing apparatus according to an exemplary embodiment of the present invention.

Exemplary embodiments of the present invention will be described in more detail below with reference to the accompanying drawings, in which exemplary embodiments of the present invention are shown. As those skilled in the art would realize, the described exemplary embodiments of the present invention may be modified in various different ways, all without departing from the spirit or scope of the present invention.

Like reference numerals may refer to like elements throughout the specification and drawings.

The drawings may be schematic drawings, and might not illustrate exemplary embodiments of the present invention in accordance to scale. Relative dimensions and ratios of portions in the drawings may be exaggerated or reduced in size for clarity of description in the specification and drawings. It will be understood that when an element such as a layer, film, region, or substrate is referred to as being "on" another element, it may be directly on the other element or intervening elements may be present.

As those skilled in the art would realize, the described embodiments may be modified in various different ways, all without departing from the spirit or scope of the present invention.

A laser crystallizing apparatus according to an exemplary embodiment of the present invention will be described in more detail below with reference to FIGS. 1 to 4.

Figure 2:
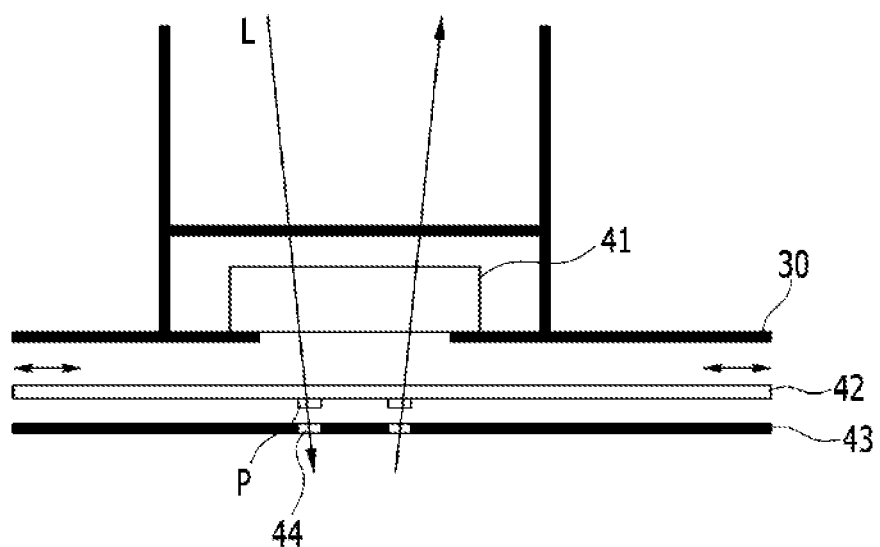
FIG. 2 is a cross-sectional view schematically illustrating a beam transmitting unit in a laser crystallizing apparatus according to an exemplary embodiment of the present invention.
Figure 3:
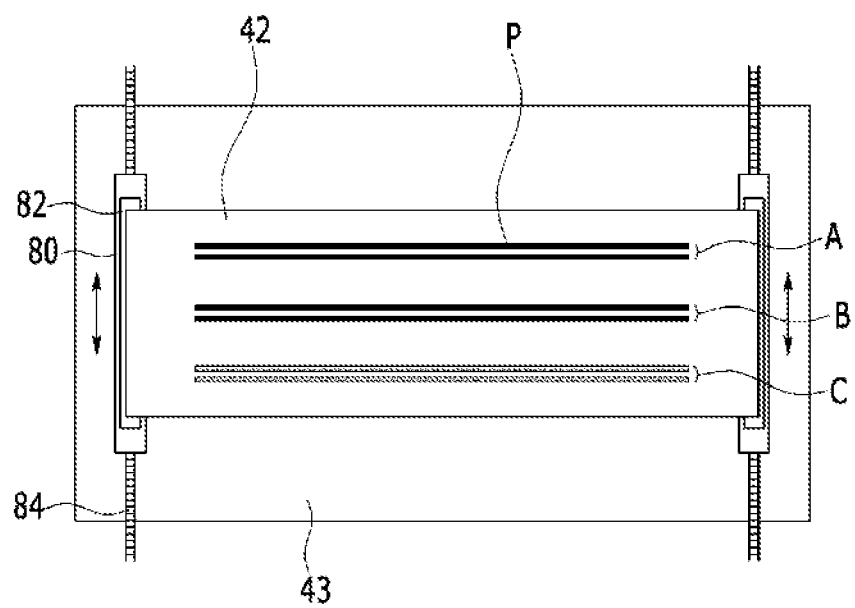
FIG. 3 is a plan view schematically illustrating a beam transmitting unit in a laser crystallizing apparatus according to an exemplary embodiment of the present invention.
Figure 4:
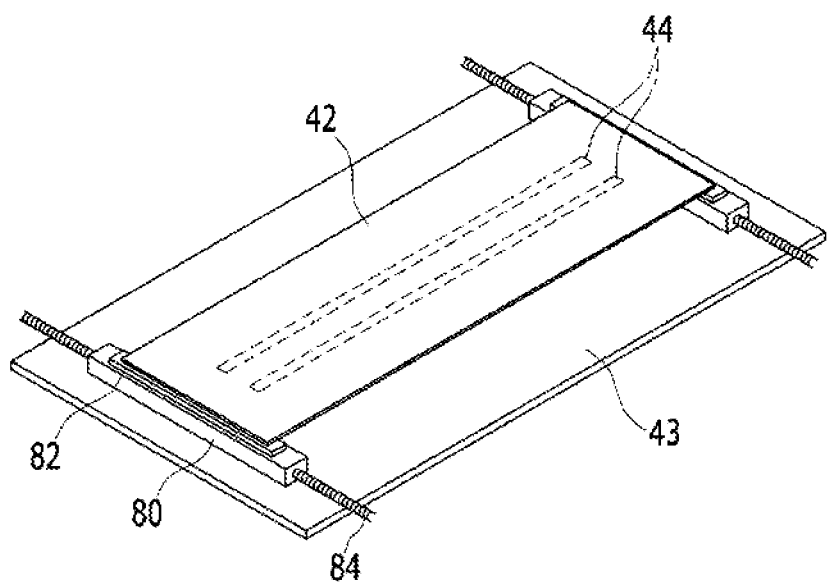
FIG. 4 is a perspective view schematically illustrating a beam transmitting unit in a laser crystallizing apparatus according to an exemplary embodiment of the present invention.

FIG. 1 is a diagram schematically illustrating a laser crystallizing apparatus according to an exemplary embodiment of the present invention. FIG. 2 is a cross-sectional view schematically illustrating a beam transmitting unit in a laser crystallizing apparatus according to an exemplary embodiment of the present invention. FIG. 3 is a plan view schematically illustrating a beam transmitting unit in a laser crystallizing apparatus according to an exemplary embodiment of the present invention. FIG. 4 is a perspective view schematically illustrating a beam transmitting unit in a laser crystallizing apparatus according to an exemplary embodiment of the present invention.

Referring to FIG. 1, a laser crystallizing apparatus 100 according to an exemplary embodiment of the present invention may include a laser generator 10 generating a laser beam L, an optical system 20 photo-converting the laser beam L to make the converted laser beam L, and a beam transmitting unit 40 forming a passage through which the laser beam L may be transmitted into a chamber 30 where a target substrate 60 on which a target thin film 70 is formed is positioned. The target substrate 60 may be mounted on a stage 50.

The laser beam L generated in the laser generator 10 may include P polarization and S polarization. The laser beam L may be photo-converted in the optical system 20 to an excimer laser beam. The excimer laser beam may induce a phase shift of the target thin film 70. The excimer laser beam may crystallize the target thin film 70 formed on the target substrate 60. The target thin film 70 may be an amorphous silicon layer and may be formed by a method such as a lower pressure chemical deposition method, a normal pressure chemical deposition method, a plasma enhanced chemical vapor deposition (PECVD) method, a sputtering method, or a vacuum evaporation method.

The optical system 20 may include at least one half wave plate (HWP). The at least one HWP may shift a polarization axis direction of the laser beam L generated by the laser generator 10, and may include at least one mirror substantially fully reflecting the laser beam L. The optical system 20 may include at least one polarization beam splitter (PBS). The at least one PBS may reflect a part of the laser beam L and may transmit the other part of the laser beam L.

In the chamber 30, an atmosphere such as nitrogen ($N_2$), air, and mixed gas may vary according to a process performed in the chamber 30, or according to a users' preferences. Pressure in the chamber 30 may vary according to a depressurized, pressurized, or vacuum state. Thus, the chamber 30 might not be an open type chamber. The chamber 30 may be a closed type chamber, which may be isolated from external air.

FIG. 2 is a cross-sectional view schematically illustrating a beam transmitting unit in the laser crystallizing apparatus according to the exemplary embodiment of the present invention.

Referring to FIG. 2, the beam transmitting unit 40 may include a chamber window 41 and a shield window 42. The laser beam L emitted through the optical system 20 may be input to the chamber 30 and thus the target thin film 70 in the chamber 30 may be crystallized. The chamber window (e.g., annealing window) 41 may serve as a medium through which the laser beam L may be input to the chamber 30. The chamber window 41 may be provided on the chamber 30 and may cover an opening on the chamber 30 through which the laser beam L passes.

The chamber window 41 may have a cuboid shape having a bottom surface. In the chamber window 41, a relatively high beam transmittance may reduce or eliminate energy loss of the laser beam L. The chamber window 41 may have a relatively large thickness and thus the chamber window 41 may tolerate a difference between internal pressure and external pressure of the chamber 30. The chamber window 41 may include quartz with a thickness of several cm.

The shield window 42 may be movably disposed below the chamber window 41. The shield window 42 may prevent a material generated in the chamber 30 from reaching the chamber window 41. The shield window 42 may prevent a contaminative material P from being absorbed in the chamber window 41. The shield window may be moved without replacing the chamber window 41, and thus when a portion of the shield window 42 is contaminated, the shield window 42 may be moved. Thus, shield window 42 may be used several times without being replaced. For example, the shield window 42 may be moved from side to side with respect to an open region 44 of the shield mask 43 after the contaminative material P is absorbed by a portion of the shield window 42.

The contamination of the shield window 42 may be determined by measuring an energy drop of the laser beam L input to the chamber 30 and uniformity of the laser beam L. When the contamination reduces the energy of the laser beam L and uniformity of the laser beam L, the shield window 42 may be moved and the laser beam L may be transmitted through a new shield window 42 portion that has not been contaminated.

The chamber window 41 may block the inside of the chamber 30 from the external air. The thickness of the chamber window 41 may be relatively large and the chamber window 41 may be sealed to the chamber 30 by an O-ring. The shield window 42 may be disposed in the chamber 30, and thus the thickness of the shield window 42 may be relatively small and the shield window 42 may be moved, as desired. The shield window 42 may include quartz having a relatively high laser beam transmittance.

When viewed from a side of the laser beam L in a short-axial direction of the laser beam L, a range in which the laser beam L passes through the chamber window 41 may be relatively small. The laser beam L may have a long axis of from about 200 mm to about 3,000 mm and a short axis of from about 0.1 mm to about 20 mm. The laser beam L may be transmitted into the inside of the chamber 30 at an angle of from about 1° to about 10° with respect to a bottom surface of the chamber window 41 and may be reflected to the outside of the chamber 30 through the chamber window 41 at substantially the same angle at which the laser beam L entered the chamber 30 after reaching the target thin film 70.

The beam transmitting unit 40 may include a shield mask 43 in which the open region 44 through which the laser beam L may pass is formed. The open region 44 may be formed as two regions through which the laser beam L transmitted into the inside of the chamber 30 and the laser beam L reflected to the outside of the chamber 30 pass, respectively. The open region 44 may be larger than the short axis of the laser beam L. The open region 44 may have a width of from about 1 mm to about 30 mm. The shield mask 43 may prevent the contaminative material P in the chamber 30 from being fully exposed to the shield window 42. The laser beam L may pass through only the open region 44 formed in the shield mask 43 and the contaminative material P may be deposited on only the shield window 42 portion corresponding to the open region 44.

The shield mask 43 may include aluminum (Al) or stainless steel (SUS) and thus a deformation of the shield mask 43 caused by the laser beam L may be relatively small and a generation of particles may be reduced or eliminated.

FIG. 3 is a plan view schematically illustrating a beam transmitting unit in a laser crystallizing apparatus according to an exemplary embodiment of the present invention. FIG. 4 is a perspective view schematically illustrating a beam transmitting unit in a laser crystallizing apparatus according to an exemplary embodiment of the present invention.

Referring to FIGS. 3 and 4, the shield window 42 may move in a vertical direction with respect to a length direction of the chamber window 41. For example, the shield window 42 may move perpendicularly with respect to a relatively longer side of the shield mask 43. An edge of the shield window 42 may be supported by a jig 82. The jig 82 may be fixed to a linear motor 80. The linear motor 80 may include a power source and may use electricity to move in a substantially straight line. The jig 82 and the linear motor 80 may move along a rail 84. The linear motor 80 may move to a desired position within a relatively short amount of time and may stop relatively abruptly. Thus, a position control of the shield window may be performed with relatively high speed and relatively high precision.

Referring to FIG. 3, a region A and a region B of the shield window 42 may illustrate regions in which the contaminative material P is deposited and a region C may illustrate a region in which the crystallizing process is currently in progress. Two open regions 44 may be formed in the shield mask 43. The contaminative material P may be deposited on the shield window 42 in two lines through the open regions 44. A trace of the contaminative material P may be formed in the region A by moving the shield window 42 to a position corresponding with the region A. The contaminative material P may be generated by performing the laser crystallizing process. After the laser crystallizing process is performed and the trace of the contaminative material P is formed in the region A, a trace of the contaminative material P may be formed in the region B by moving the shield window 42 to a position corresponding with the region B. Since two open regions 44 may be formed in the shield mask 43 disposed below the shield window 42, the trace of the contaminative material P may be formed in two lines.

Referring to FIG. 3, an area in which the crystallizing process may be performed by movement of the shield window 42 about two times is illustrated. However, according to an exemplary embodiment of the present invention, when the size of the shield window 42 is increased, the shield window 42 may be moved and used more than two times.

Figure 5:
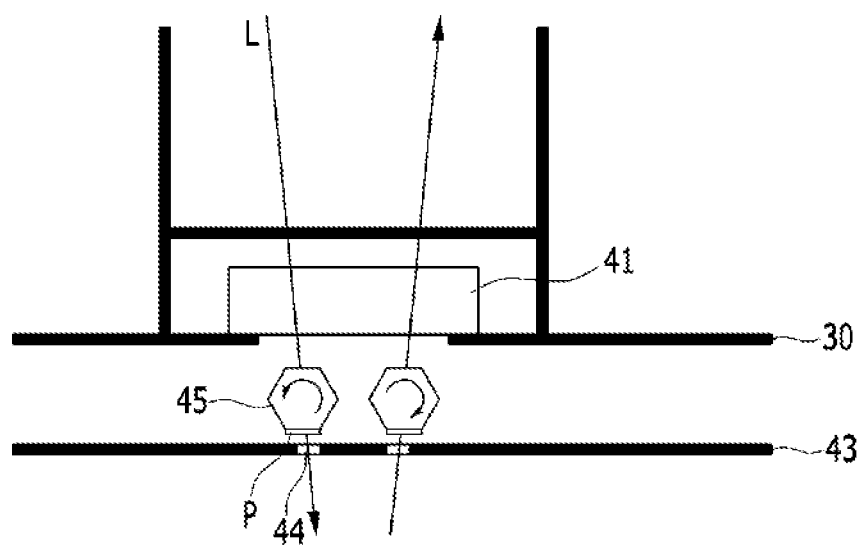
FIG. 5 is a cross-sectional view schematically illustrating a beam transmitting unit in a laser crystallizing apparatus according to an exemplary embodiment of the present invention.

FIG. 5 is a cross-sectional view schematically illustrating a beam transmitting unit in a laser crystallizing apparatus according to an exemplary embodiment of the present invention.

Referring to FIG. 5, a shield window 45 may have a polygonal column shape. The polygonal column shape of the shield window 45 may have an even number of surfaces. The shield window 45 may rotate along an axis extended in a parallel direction with respect to the length direction of the chamber window 41. The shield window 45 may be connected to a motor and the shield window 45 may rotate by driving the motor.

The shield mask 43 in which the open region 44 through which the laser beam L may pass is formed may be disposed below the shield window 45. Since the shield window 45 may be formed in the polygonal column shape having an even number of surfaces, when one side exposed to the open region 44 of the shield mask 43 is contaminated and the contaminative material P is accumulated, another side of the shield window 45 may be exposed to the open region 44 of the shield mask 43 by rotating the shield window 45.

The shield window 45 may have any one shape of a hexagon, an octagon, and a decagon, for example. However, exemplary embodiments of the present invention are not limited to a particular number of surfaces of the shield window 45. The shield window 45 may include quartz having a relatively high beam transmittance. The shield mask 43 may include aluminum (Al) or stainless steel (SUS) and thus a deformation of the shield mask 43 caused by the laser beam L may be relatively small and a generation of particles may be reduced or eliminated.

Referring to FIG. 5, shield windows 45 may be disposed on a path where the laser beam L is transmitted into the chamber 30 and a path where the laser beam L is transmitted to the outside of the chamber 30, respectively. Each open region 44 may be formed in the shield mask 43 corresponding to each shield window 45. The open region 44 may be a larger width than the short axis of the laser beam L. The open region may have a width from about 1 mm to about 30 mm.

Figure 6:
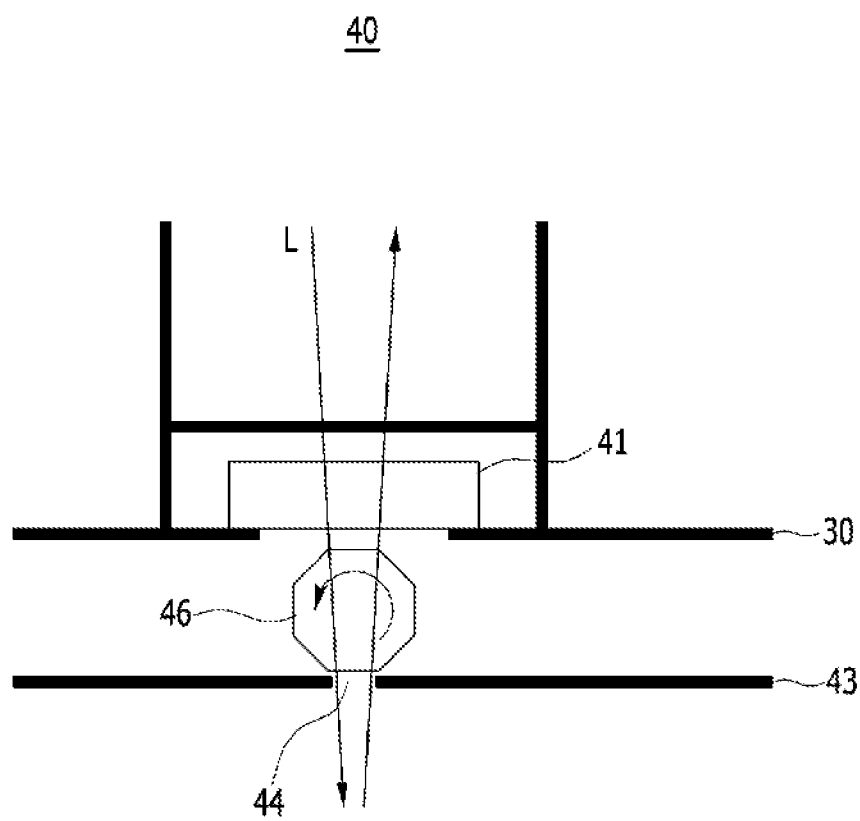
FIG. 6 is a cross-sectional view schematically illustrating a beam transmitting unit in a laser crystallizing apparatus according to an exemplary embodiment of the present invention.

FIG. 6 is a cross-sectional view schematically illustrating a beam transmitting unit in a laser crystallizing apparatus according to an exemplary embodiment of the present invention.

Referring to FIG. 6, when a distance between a path of the laser beam L transmitted into the chamber 30 and a path of the laser beam L transmitted out of the chamber 30 is relatively small, one shield window 46 having a polygonal column shape may pass the laser beam L both into and out of the chamber 30. The shield mask 43 in which the open region 44 through which the laser beam L passes is formed may be disposed below the shield window 45. One open region 44 may be formed in the shield mask 43 corresponding to one shield window 46. The size and the number of the shield windows 46 may be varied, as desired.

According to an exemplary embodiment of the present invention, the shield window may be movable or rotatable, and thus it may be possible to use the chamber window substantially without replacement of the chamber window. The shield window may be a planar or polygonal shield window which may be used multiple times, and thus the chamber may be used for a relatively long period of time without opening the chamber. A frequency of replacement of the chamber window may be reduced and replacement costs of the chamber window may be reduced.

While the present invention has been shown and described with reference to the exemplary embodiments thereof, it will be apparent to those of ordinary skill in the art that various changes in form and detail may be made thereto without departing from the spirit and scope of the present invention.

What is claimed is:

1. A laser crystallizing apparatus, comprising:
a laser generator generating a laser beam; an optical system photo-converting the laser beam to make a converted laser beam; and
a beam transmitting unit including a passage through which the converted laser beam is transmitted into a chamber, wherein
the beam transmitting unit includes:
a chamber window provided on the chamber to transmit the laser beam, and
a shield window rotationally disposed below the chamber window to prevent a material generated in the chamber from reaching the chamber window,
wherein the shield window comprises a base and six or more surfaces perpendicular to the base that form sides of a polygonal column, wherein the laser beam is transmitted through at least two of the six or more surfaces.

2. The laser crystallizing apparatus of claim 1, wherein: the beam transmitting unit further includes a shield mask in which an open region through which the laser beam passes is formed.

3. The laser crystallizing apparatus of claim 1, wherein: the shield window is rotatable.

4. The laser crystallizing apparatus of claim 1, wherein: the shield window has any one shape of a hexagon, an octagon, and a decagon.

5. The laser crystallizing apparatus of claim 1, wherein: two or more shield windows are disposed on a path where the laser beam is transmitted into the chamber and a path where the laser beam is transmitted to the outside of the chamber, respectively, wherein the two or more shield windows are separated in a direction parallel to the surface through which the laser beam is transmitted.

* * * * *